United States Patent
Hyakudai et al.

(10) Patent No.: US 11,669,484 B2
(45) Date of Patent: Jun. 6, 2023

(54) IMAGE SENSOR

(71) Applicant: Sony Semiconductor Solutions Corporation, Kanagawa (JP)

(72) Inventors: Toshihisa Hyakudai, San Diego, CA (US); Hiroo Takahashi, Kanagawa (JP); Takayuki Hirama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/818,449

(22) Filed: Mar. 13, 2020

(65) Prior Publication Data

US 2021/0286753 A1 Sep. 16, 2021

(51) Int. Cl.
*G06F 13/42* (2006.01)
*G06F 13/40* (2006.01)
*G06F 13/38* (2006.01)

(52) U.S. Cl.
CPC ........ *G06F 13/4282* (2013.01); *G06F 13/382* (2013.01); *G06F 13/4004* (2013.01); *G06F 2213/0016* (2013.01)

(58) Field of Classification Search
CPC .......................... G06F 13/4282; G06F 13/382
See application file for complete search history.

(56) References Cited

U.S. PATENT DOCUMENTS

| | | | | |
|---|---|---|---|---|
| 11,102,445 | B1* | 8/2021 | Engelkemier | .......... H04N 7/025 |
| 2006/0184976 | A1* | 8/2006 | Lee | .................... H04N 21/4263 |
| | | | | 725/81 |
| 2014/0013017 | A1* | 1/2014 | DeCesaris | ........... G06F 13/4282 |
| | | | | 710/105 |
| 2014/0169386 | A1* | 6/2014 | Diab | ....................... H04L 67/10 |
| | | | | 370/437 |
| 2017/0255588 | A1* | 9/2017 | Pitigoi-Aron | ......... G06F 13/364 |
| 2017/0270060 | A1* | 9/2017 | Gupta | ................. G06F 13/4068 |
| 2018/0232324 | A1* | 8/2018 | Mishra | .................. G06F 13/404 |
| 2018/0367504 | A1 | 12/2018 | Srivastava | |
| 2019/0087377 | A1* | 3/2019 | Srivastava | .......... G06F 13/4063 |

FOREIGN PATENT DOCUMENTS

| | | | |
|---|---|---|---|
| JP | 10282933 | A | 10/1998 |
| JP | 2012058887 | A | 3/2012 |
| JP | 2019508915 | A | 3/2019 |

OTHER PUBLICATIONS

Wikipedia, FPD-Link, Jun. 20, 2019, p. 1-3 (Year: 2019).*

(Continued)

*Primary Examiner* — Henry Tsai
*Assistant Examiner* — Dean Phan
(74) *Attorney, Agent, or Firm* — Michael Best & Friedrich LLP

(57) ABSTRACT

[Overview]
[Problem to be Solved] To provide a communication device and a communication system that each enable transmission of a command and data of I3C in a protocol different from the I3C.
[Solution] A communication device according to a first aspect of the present disclosure includes: an I3C device section that generates a command and data of I3C; and a communication device section that transmits the command and data of the I3C to another communication device via a bus by using a payload in a protocol different from the I3C.

22 Claims, 12 Drawing Sheets

(56) References Cited

OTHER PUBLICATIONS

Joel Hulous, Automotive Applications Drive MIPI A-Phy development, Jun. 12, 2019, p. 1-5 (Year: 2019).*
www.study-ccna.com, Half Duplex and Full Duplex, Nov. 2016, pp. 1-3 (Year: 2016).*
International Search Report dated Jun. 1, 2021 for corresponding International Application No. PCT/JP2021/008280.

* cited by examiner

IMAGE SENSOR

TECHNICAL FIELD

The present disclosure relates to a communication device and a communication system.

BACKGROUND ART

Conventionally, for example, I²C (Inter-Integrated Circuit) has been widely utilized as bus IF (Interface) used for communication within a board with a plurality of devices mounted thereon. In addition, recently, there is more demand for higher-speed I²C, and a specification of I3C (Improved Inter Integrated Circuit) is in progress as the next generation standard. For example, a communication system using the I3C is disclosed, for example, in PTL 1.

CITATION LIST

Patent Literature

PTL 1: International Publication No. WO 2017/061330

SUMMARY OF THE INVENTION

Problems to be Solved by the Invention

Incidentally, to achieve various kinds of communication, it is required to transmit a command and data of the I3C in a protocol different from the I3C. Therefore, it is desirable to provide a communication device and a communication system that each enable the transmission of the command and data of the I3C in a protocol different from the I3C.

Means for Solving the Problems

A communication device according to a first aspect of the present disclosure includes: an I3C device section that generates a command and data of I3C; and a communication device section that transmits the command and data of the I3C to another communication device via a bus by using a payload in a protocol different from the I3C.

In the communication device according to the first aspect of the present disclosure, the command and data of the I3C are transmitted to the other communication device via the bus by using the payload in the protocol different from the I3C. In this way, the use of the payload enables the transmission of the command and data of the I3C in the protocol different from the I3C.

A communication device according to a second aspect of the present disclosure includes a reception device section that receives a command and data of an I3C from another communication device via a bus by using a payload in a protocol different from the I3C. This communication device further includes a transmission device section that transmits the data of the I3C to the other communication device via the bus by using the payload in the protocol different from the I3C, as a response to the command and data of the I3C received by the reception device section.

In the communication device according to the second aspect of the present disclosure, the command and data of the I3C are received from the other communication device via the bus by using the payload in the protocol different from the I3C, and as a response to the received command and data of the I3C, the data of the I3C is transmitted to the other communication device via the bus by using the payload in the protocol different from the I3C. In this way, the use of the payload enables the transmission and reception of the command and data of the I3C in the protocol different from the I3C.

A communication system according to the first aspect of the present disclosure includes a first communication device and a second communication device that communicate via a bus. The first communication device includes: an I3C device section that generates a command and data of I3C; and a communication device section that transmits the command and data of the I3C to another communication device via a bus by using a payload in a protocol different from the I3C.

In the communication system according to the first aspect of the present disclosure, the command and data of the I3C are transmitted from the first communication device to the second communication device via the bus by using the payload in the protocol different from the I3C. In this way, the use of the payload enables the transmission of the command and data of the I3C in the protocol different from the I3C.

MODES FOR CARRYING OUT THE INVENTION

The following describes a mode for carrying out the present disclosure in detail with reference to the drawings. The following description is a specific example of the present disclosure, but the present disclosure is not limited to the following mode.

<Configuration Example of Communication System>

Figure 1:
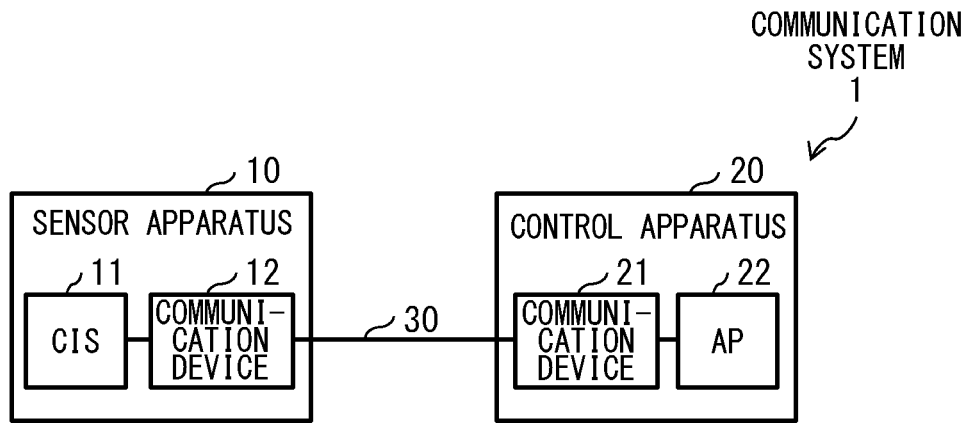
FIG. 1 is a diagram illustrating a schematic configuration example of a communication system according to an embodiment of the present disclosure.

FIG. 1 illustrates a schematic configuration example of a communication system 1 according to a first embodiment of the present disclosure. The communication system 1 is mounted on, for example, a vehicle such as an automobile. The communication system 1 includes a sensor apparatus 10 and a control apparatus 20. The sensor apparatus 10 and the control apparatus 20 are coupled to each other via a bus 30. A-PHY, which is a physical layer standard developed by MIPI (Mobile Industry Processor Interface) alliance, is used for signal transmission between the sensor apparatus 10 and the control apparatus 20 via the bus 30. The A-PHY is assumed to handle a maximum transmission distance of, for example, 15 m.

The sensor apparatus 10 includes, for example, an image sensor 11 (CIS) and a communication device 12. The image sensor 11 is coupled to the communication device 12 via a bus in compliance with the I3C standard. The control apparatus 20 includes, for example, a communication device 21 and an application processor 22 (AP). The application processor 22 is coupled to the communication device 21 via a bus in compliance with the I3C standard. Communication in compliance with the A-PHY standard is performed between the communication device 12 and the communication device 21 via the bus 30.

Figure 2:
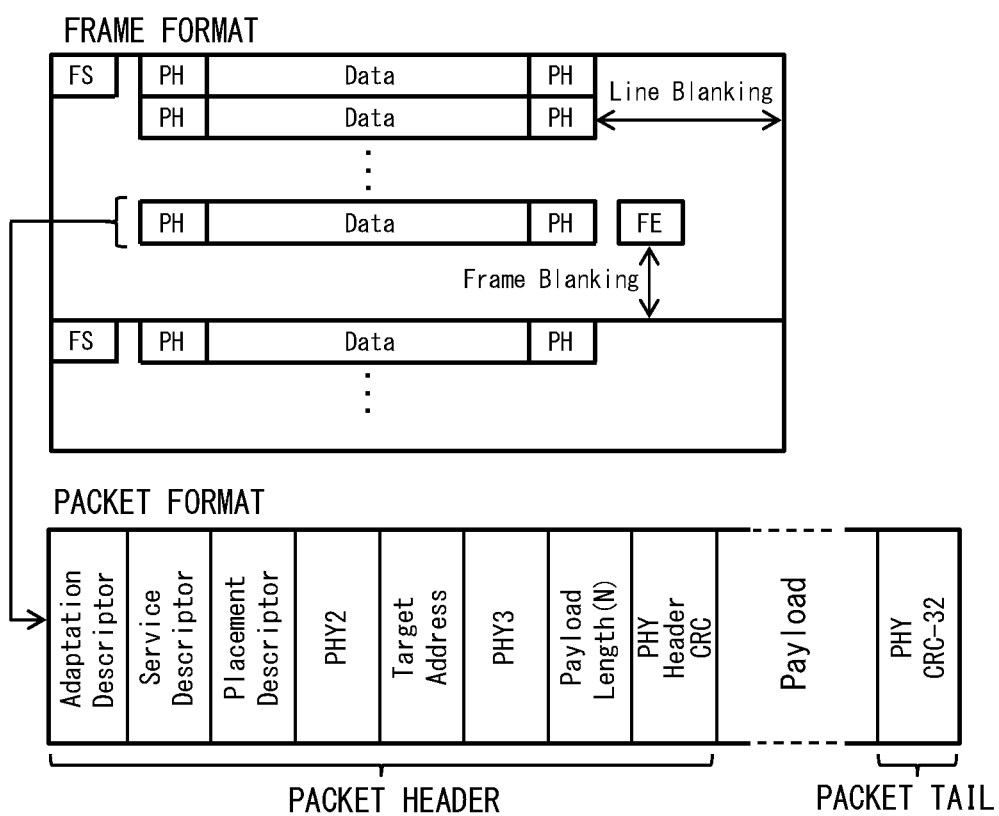
FIG. 2 is a diagram illustrating an example of a frame format and a packet format that are used for communication in compliance with an A-PHY standard in the communication system of FIG. 1.

FIG. 2 illustrates an example of a frame format and a packet format that are used for communication in compliance with the A-PHY standard in the communication system 1.

For example, in a frame format for transmitting a one-frame image, a packet is generated for each line of the image, or a packet is generated for each of the respective pieces of data provided by dividing the line into a plurality of pieces from a frame start (FS: Frame Start) indicative of the start of the frame to a frame end (FE: Frame End) indicative of the end of the frame. In the packet generated for each line of the image, data for the line is stored. In the packet generated for each piece of data, the data is stored.

In an A-PHY packet format, a packet header is placed at the beginning and a packet tail is placed at the end. A payload for storing data is then placed between the packet header and the packet tail. The packet tail includes, for example, PHY CRC-32. The packet header includes, for example, an Adaptation Descriptor, a Service Descripotor, a Placement Descriptor, PHY2, a Target Address, and PHY3, Payload Length, and PHY Header CRC. The Adaptation Descriptor includes, for example, an Adaptation Type Value. Examples of the Adaptation Type Value include I²C, I3C, GPIO, and the like. In this specification, the I3C is set as the Adaptation Type Value.

<Functional Blocks of Communication Devices 12 and 21>

Figure 3:
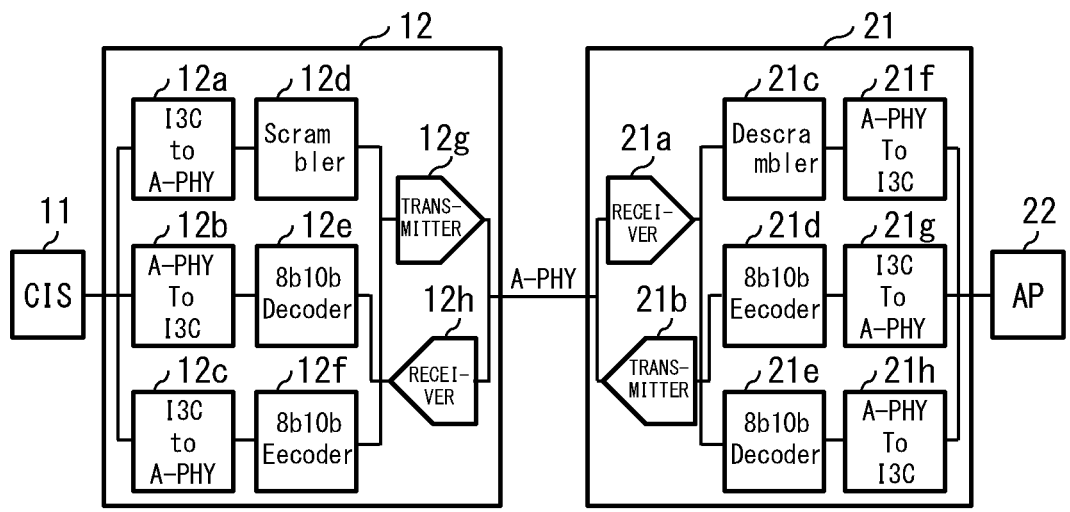
FIG. 3 is a diagram illustrating an example of functional blocks of communication devices in a sensor apparatus and a control apparatus.

FIG. 3 illustrates an example of functional blocks of the communication devices 12 and 21.

The communication device 12 includes, for example, converters 12a, 12b, and 12c, a scrambler 12d, a decoder 12e, an encoder 12f, a transmitter 12g, and a receiver 12h. The communication device 21 includes, for example, a receiver 21a, a transmitter 21b, a descrambler 21c, an encoder 21d, a decoder 21e, and converters 21f, 21g, and 21h.

The converter 12a acquires image data of the I3C from the image sensor 11 and generates a command of the I3C. The converter 12a further converts the image data and command of the I3C into transmission data of the A-PHY (a protocol different from the I3C) and outputs the transmission data to the scrambler 12d. The converter 12b converts the transmission data of the A-PHY inputted from the decoder 12e into a command and data of the I3C and outputs the command and data of the I3C to the image sensor 11. The converter 12c acquires image data of the I3C from the image sensor 11 and generates a command of the I3C. The converter 12c further converts the image data and command of the I3C into transmission data of the A-PHY and outputs the transmission data of the A-PHY to the encoder 12f.

The scrambler 12d scrambles the transmission data of the A-PHY inputted from the converter 12a and outputs the scrambled data to the transmitter 12g. The decoder 12e decodes transmission data of the A-PHY inputted from the receiver 12h and outputs the decoded transmission data to the converter 12b. The encoder 12f encodes the transmission data of the A-PHY inputted from the converter 12c and outputs the encoded data to the transmitter 12g. The transmitter 12g transmits the transmission data of the A-PHY inputted from the scrambler 12d or the encoder 21d to the communication device 21 via the bus 30. The receiver 12h receives the transmission data of the A-PHY transmitted from the communication device 21 via the bus 30 and outputs the received transmission data to the decoder 12e.

The receiver 21a receives the transmission data of the A-PHY transmitted from the communication device 12 via the bus 30 and outputs the received transmission data to the descrambler 21c or the decoder 21e. The transmitter 21b transmits the transmission data of the A-PHY inputted from the encoder 21d to the communication device 12 via the bus 30. The descrambler 21c descrambles the transmission data of the A-PHY inputted from the receiver 21a and outputs the descrambled data to the converter 21f. The encoder 21d encodes the transmission data of the A-PHY inputted from the converter 21g and outputs the encoded data to the transmitter 21b. The decoder 21e decodes transmission data of the A-PHY inputted from the receiver 21a and outputs the decoded transmission data to the converter 21h.

The converter 21f converts the transmission data of the A-PHY inputted from the descrambler 21c into image data and command of the I3C and transmits the image data and command of the I3C to the application processor 22. The converter 21g converts the data and command of the I3C transmitted from the application processor 22 into transmission data of the A-PHY and outputs the transmission data of the A-PHY to the encoder 21d. The converter 21h converts the transmission data of the A-PHY inputted from the decoder 21e into image data and command of the I3C and transmits the image data and command of the I3C to the application processor 22.

<Hierarchical Structures of Communication Devices 12 and 21>

Figure 4:
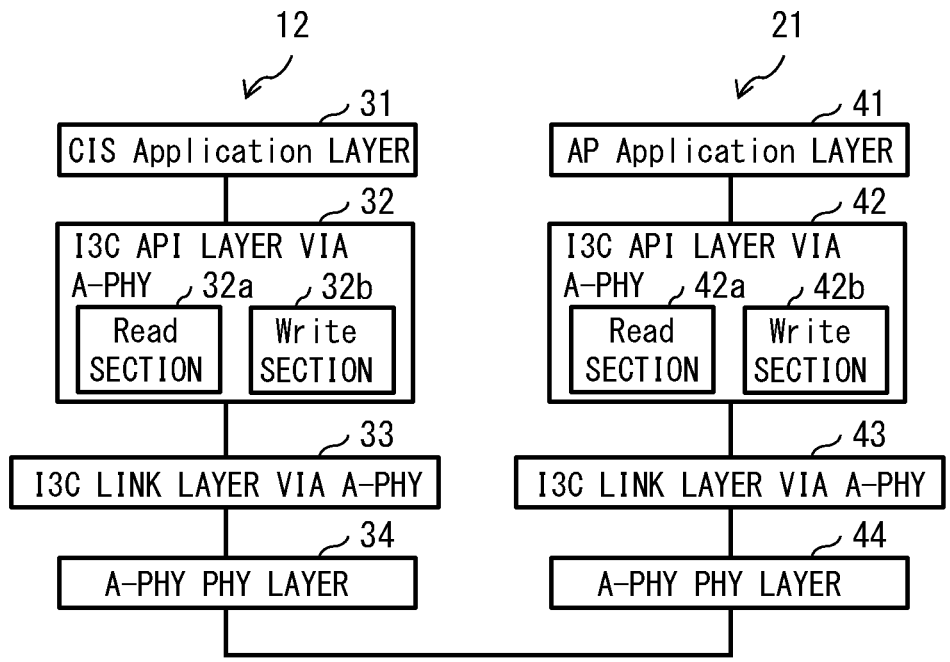
FIG. 4 is a diagram illustrating an example of hierarchical structures of the communication devices in the sensor apparatus and the control apparatus.

FIG. 4 illustrates an example of the hierarchical structures of the communication devices 12 and 21.

The communication device 12 includes, for example, an application layer (AP layer) 31 as an uppermost layer, and an application program interface layer (API layer) 32 as a lower layer under the AP layer 31. The communication device 12 further includes, for example, a LINK layer 33 as a lower layer under the API layer 32 and a PHY layer 34 as a lowermost layer. The API layer 32 includes a Read section 32*a* and a Write section 32*b*. The communication device 21 includes, for example, an application layer (AP layer) 41 as an uppermost layer, and an application program interface layer (API layer) 42 as a lower layer under the AP layer 41. The communication device 21 further includes, for example, a LINK layer 43 as a lower layer under the API layer 42 and a PHY layer 44 as a lowermost layer. The API layer 42 includes a Read section 42*a* and a Write section 42*b*.

The AP layer 31 generates and provides data, a command, and the like to the API layer 32. The API layer 32 converts the data, the command, and the like provided from the AP layer 31 into a data format (a data format based on the A-PHY standard) processable by the LINK layer 33 or the PHY layer 34. The API layer 32 converts the data, the command, and the like provided from the LINK layer 33 into a data format processable by the AP layer 31. For example, the Read section 32*a* converts the Read data, the command, and the like provided from the AP layer 31 into a data format (a data format based on the A-PHY standard) processable by the LINK layer 33 or the PHY layer 34. For example, the Read section 32*a* converts the data, the Read command, and the like provided from the LINK layer 33 into a data format process able by the AP layer 31. For example, the Write section 32*b* converts the data, the Write command, and the like provided from the AP layer 31 into a data format (a data format based on the A-PHY standard) processable by the LINK layer 33 or the PHY layer 34. For example, the Write section 32*b* converts the Write data, the command, and the like provided from the LINK layer 33 into a data format processable by the AP layer 31. The LINK layer 33 secures a physical communication path with a communication partner and performs contention control and the like. The PHY layer 34 is physically coupled to the PHY layer 44 mutually.

The AP layer 41 generates and provides data, a command, and the like to the API layer 42. The API layer 42 converts the data, the command, and the like provided from the AP layer 41 into a data format (a data format based on the A-PHY standard) processable by the LINK layer 43 or the PHY layer 44. The API layer 42 converts the data, the command, and the like provided from the LINK layer 43 into a data format processable by the AP layer 41. For example, the Read section 42*a* converts the Read data, the command, and the like provided from the AP layer 41 into a data format (a data format based on the A-PHY standard) processable by the LINK layer 43 or the PHY layer 44. For example, the Read section 42*a* converts the data, the Read command, and the like provided from the LINK layer 43 into a data format process able by the AP layer 41. For example, the Write section 42*b* converts the data, the Write command, and the like provided from the AP layer 41 into a data format (a data format based on the A-PHY standard) processable by the LINK layer 43 or the PHY layer 44. For example, the Write section 42*b* converts the Write data, the command, and the like provided from the LINK layer 43 into a data format processable by the AP layer 41. The LINK layer 43 secures a physical communication path with a communication partner and performs contention control and the like. The PHY layer 44 is physically coupled to the PHY layer 34 mutually.

<Data Transmission>

Figure 5:
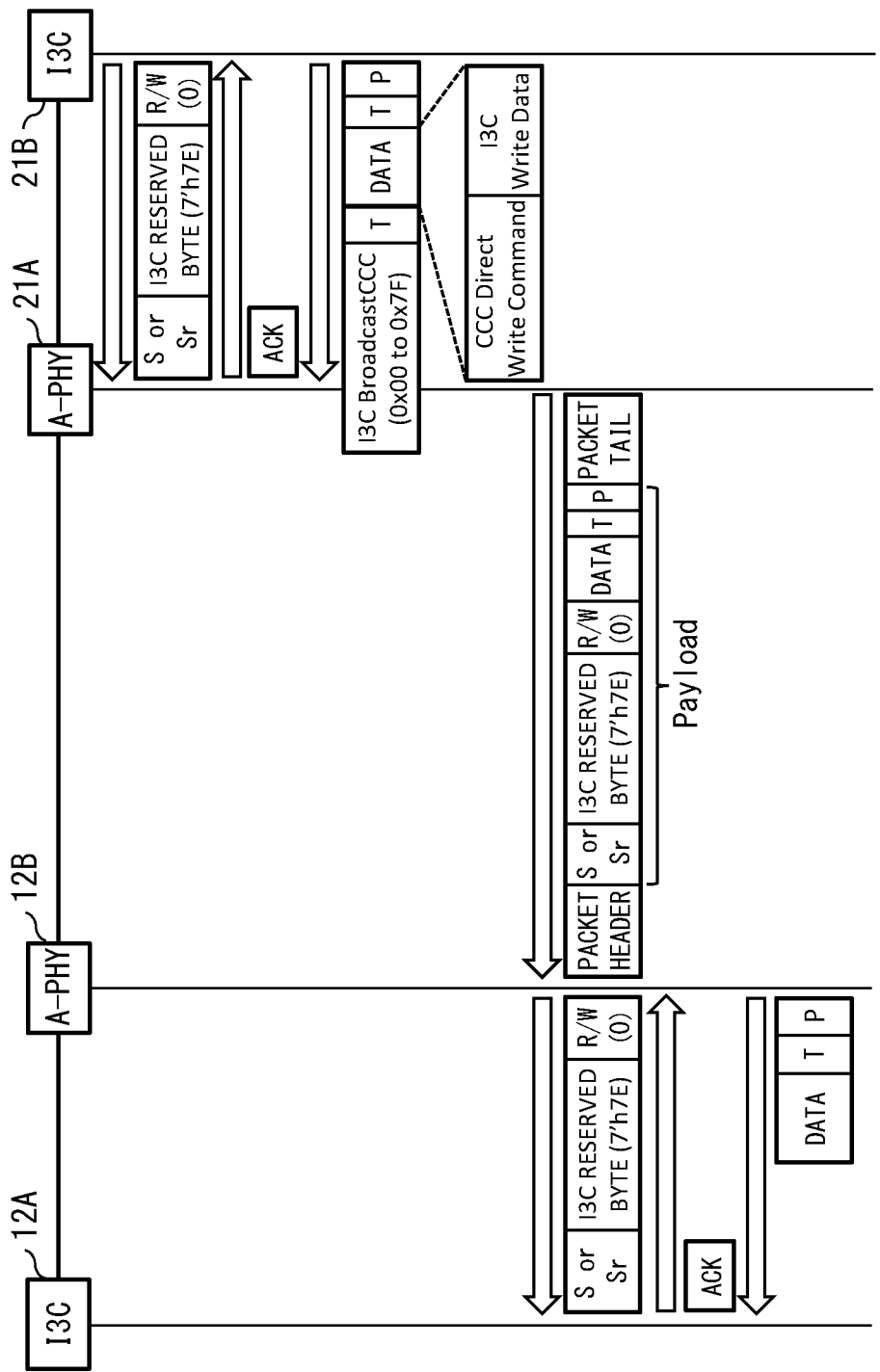
FIG. 5 is a diagram illustrating an example of data transmission in the communication system of FIG. 1.
Figure 6:
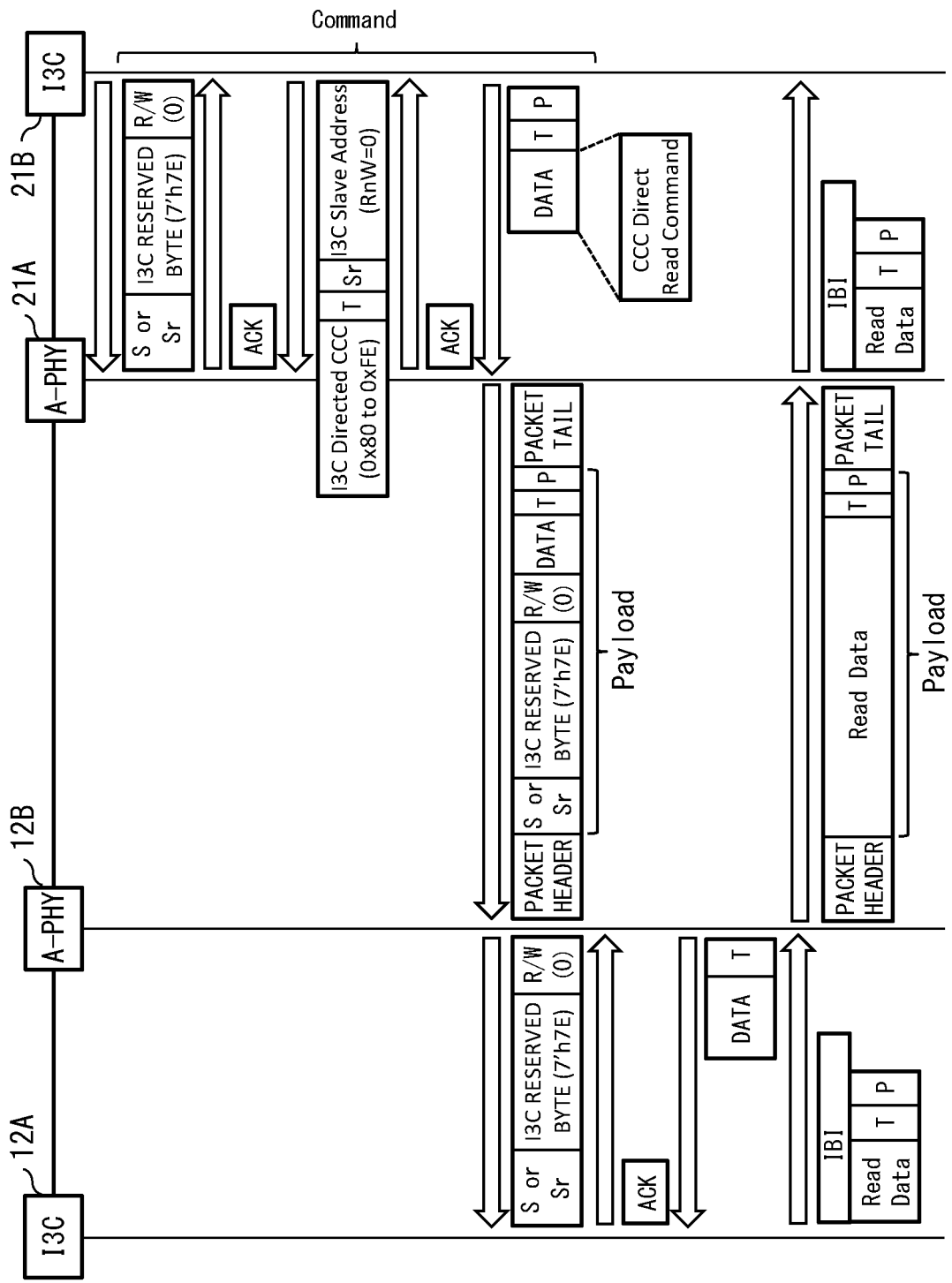
FIG. 6 is a diagram illustrating an example of the data transmission in the communication system of FIG. 1.
Figure 7:
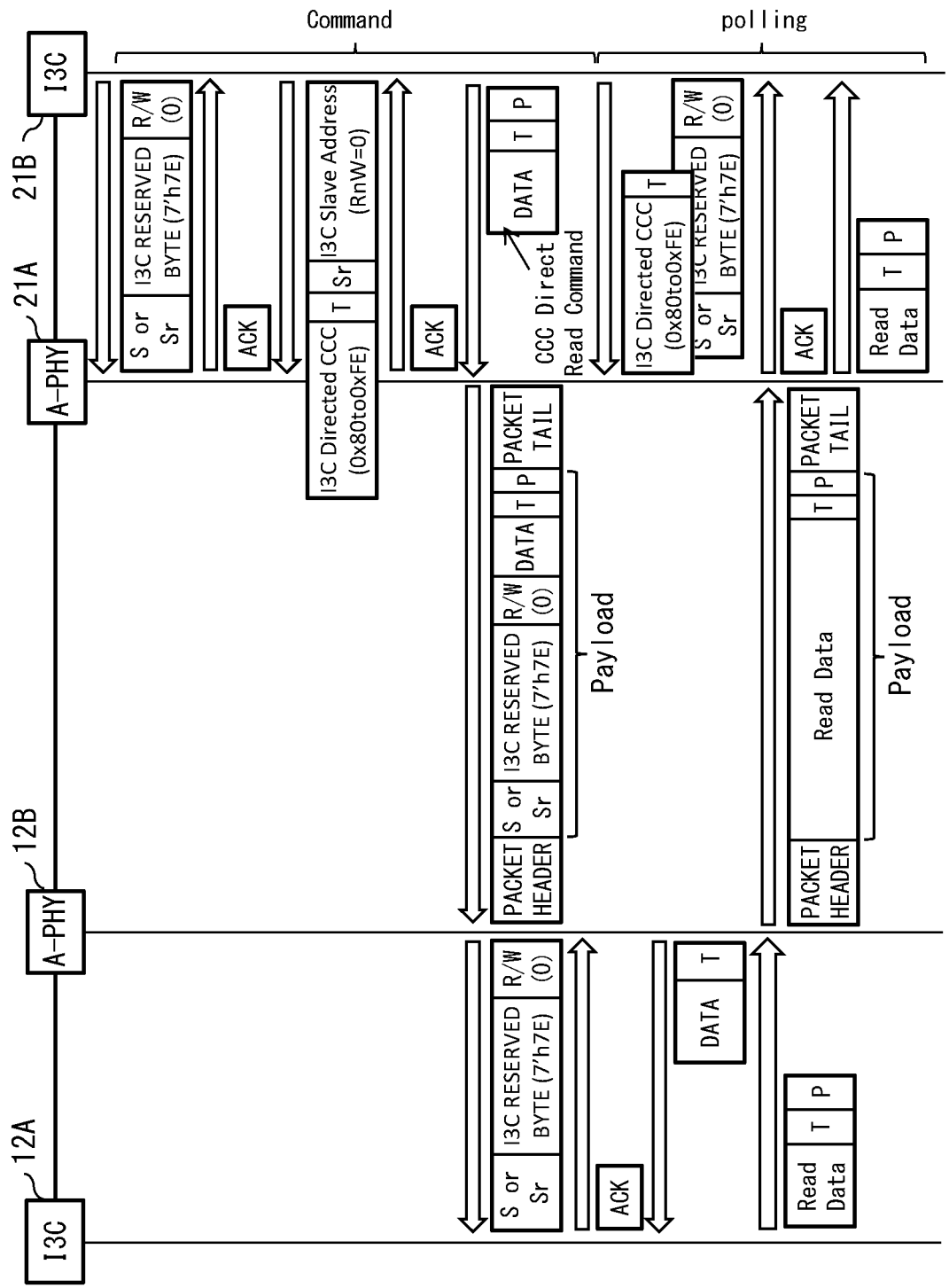
FIG. 7 is a diagram illustrating an example of the data transmission in the communication system of FIG. 1.
Figure 8:
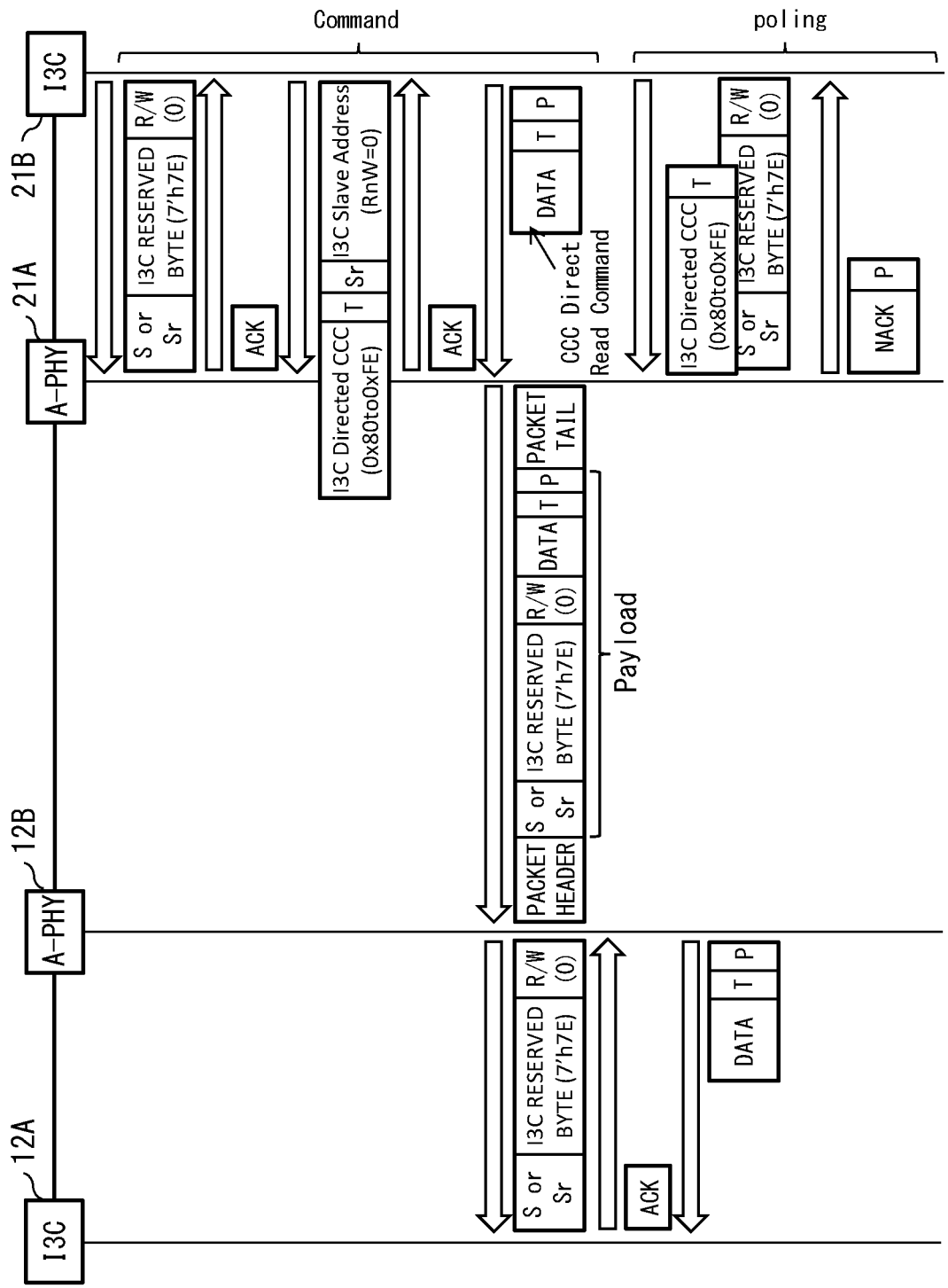
FIG. 8 is a diagram illustrating an example of the data transmission in the communication system of FIG. 1.
Figure 9:
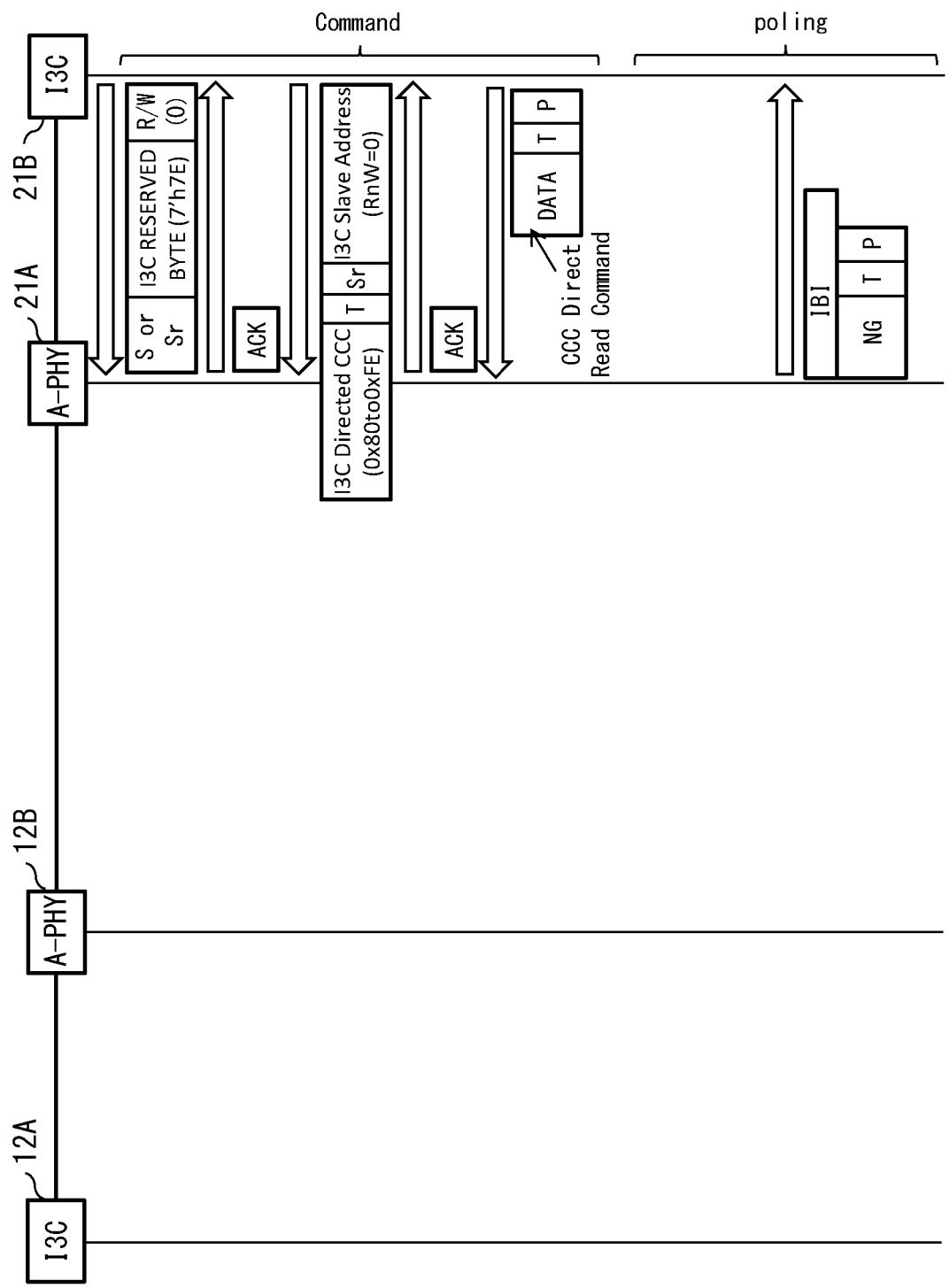
FIG. 9 is a diagram illustrating an example of the data transmission in the communication system of FIG. 1.

Next, a schematic description is given on a data transmission process executed in the communication system 1 with reference to the flowcharts illustrated in FIGS. 5 to 9. FIG. 5 illustrates an example of a flowchart of a writing process executed in the communication system 1. FIGS. 6 and 7 each illustrate an example of a flowchart of a reading process executed in the communication system 1. FIGS. 8 and 9 each illustrate an example of a flowchart of an error process performed upon failure of a reading process when the communication system 1 executes the reading process.

It is to be noted that FIGS. 5 to 9 each illustrate that "12A" represents an I3C device section in the communication device 12, and "12B" represents an A-PHY device section in the communication device 12. In addition, FIGS. 5 to 9 each illustrate that "21A" represents an A-PHY device section in the communication device 21, and "21B" represents an I3C device section in the communication device 21.

The I3C device section 12A is a circuit that executes data processing based on the I3C standard. For example, the I3C device section 12A acquires image data of the I3C from the image sensor 11 or generates and outputs a command and data of the I3C to the A-PHY device section 12B. The A-PHY device section 12B is an MIPI A-PHY circuit that converts the data and command of the I3C inputted from the I3C device section 12A into those of the A-PHY and transmits the data and command of the A-PHY to the A-PHY device section 21A. Alternatively or additionally, the A-PHY device section 12B is an MIPI A-PHY circuit that converts the data and command of the A-PHY transmitted from the A-PHY device section 21A into data and command of the I3C and outputs the data and command of the I3C to the I3C device section 12A. The A-PHY device section 12B transmits the command of the I3C to the control apparatus 20 (the communication device 21) via the MIPI A-PHY circuit.

The I3C device section 21B is a circuit that executes data processing based on the I3C standard. For example, the I3C device section 21B generates data and command of the I3C, and outputs the generated data and command of the I3C to the A-PHY device section 21A. The A-PHY device section 21A is an MIPI A-PHY circuit that converts the data and command of the I3C inputted from the I3C device section 21B into those of the A-PHY and transmits the data and command of the A-PHY to the A-PHY device section 12B. Alternatively or additionally, the A-PHY device section 21A is an MIPI A-PHY circuit that converts the data and command of the A-PHY transmitted from the A-PHY device section 12B into data and command of the I3C and outputs the data and command of the I3C to the I3C device section 21B. The A-PHY device section 21A transmits the command of the I3C to the sensor apparatus 10 (the communication device 12) via the MIPI A-PHY circuit.

(Writing Process)

First, a description is given on a writing process executed in the communication system 1 with reference to FIG. 5. First, the I3C device section 21B generates a command of the I3C (S or Sr+I3C RESERVED BYTE (7'h7E)+R/W (0)) as a Write request command and transmits the command to the A-PHY device section 21A. When normally receiving the Write request command, the A-PHY device section 21A returns ACK to the I3C device section 21B as a response to the reception of the Write request command.

When receiving the ACK from the A-PHY device section 21A, the I3C device section 21B transmits DATA to the A-PHY device section 21A along with I3C Broadcast CCC (Common Command Code). The DATA includes an I3C CCC Write command and I3C Write data. When receiving the I3C Broadcast CCC and the DATA, the A-PHY device section 21A encapsulates the Write request command and the DATA into a payload, and transmits the encapsulated Write request command and DATA as an A-PHY packet to the sensor apparatus 10 (the communication device 12) via the bus 30. That is, the A-PHY device section 21A transmits the Write request command, the I3C CCC Write command, and the I3C Write data to the sensor apparatus 10 (the communication device 12) via the bus 30 by using the payload in the A-PHY.

The A-PHY device section 12B receives the A-PHY packet from the control apparatus 20 (the communication device 21) via the bus 30. That is, the A-PHY device section 12B receives the A-PHY packet from the control apparatus 20 (the communication device 21) via the bus 30 by using the payload in the A-PHY. The A-PHY device section 12B extracts the Write request command from the payload of the received A-PHY packet, and transmits the extracted Write request command to the I3C device section 12A. When normally receiving the Write request command from the A-PHY device section 12B, the I3C device section 12A returns ACK to the A-PHY device section 12B as a response to the reception of the Write request command.

When receiving the ACK from the I3C device section 12A, the A-PHY device section 12B transmits the I3C CCC Write command and the I3C Write data to the I3C device section 12A. When receiving the I3C CCC Write command and the I3C Write data from the A-PHY device section 12B, the I3C device section 12A stores the received I3C Write data in a predetermined address. In this way, the writing process in the communication system 1 is executed. It is to be noted that the above-described writing process has been described by using Broadcast CCC as an example, but it is also possible to execute the above-described writing process with Broadcast CCC replaced with Directed CCC.

(Reading Process)

Next, a description is given on a reading process executed in the communication system 1 with reference to FIG. 6. First, the I3C device section 21B generates a command of the I3C (S or Sr+I3C RESERVED BYTE (7'h7E)+R/W (0)) as a Read request command and transmits the command to the A-PHY device section 21A. When normally receiving the Read request command, the A-PHY device section 21A returns ACK to the I3C device section 21B as a response to the reception of the Read request command.

When receiving the ACK from the A-PHY device section 21A, the I3C device section 21B transmits an I3C Slave Address (RnW=1) to the A-PHY device section 21A along with I3C Directed CCC. When normally receiving the I3C Directed CCC and the Slave Address (RnW=1) successfully, the A-PHY device section 21A returns ACK to the I3C device section 21B as a response thereto. When receiving the ACK from the A-PHY device section 21A, the I3C device section 21B transmits an I3C CCC Direct Read command as DATA to the A-PHY device section 21A. At this time, the I3C device section 21B waits until an IBI command is transmitted thereto from the A-PHY device section 21A in a response to the I3C CCC Direct Read command.

When receiving the I3C CCC Direct Read command, the A-PHY device section 21A encapsulates the Read request command and the I3C CCC Direct Read command into a payload and transmits the encapsulated commands to the sensor apparatus 10 (the communication device 12) as an A-PHY packet via the bus 30. That is, the A-PHY device section 21A transmits the Read request command and the I3C CCC Direct Read command to the sensor apparatus 10 (the communication device 12) via the bus 30 by using the payload in the A-PHY.

The A-PHY device section 12B receives the A-PHY packet from the control apparatus 20 (the communication device 21) via the bus 30. That is, the A-PHY device section 12B receives the A-PHY packet from the control apparatus 20 (the communication device 21) via the bus 30 by using the payload in the A-PHY. The A-PHY device section 12B extracts the Read request command from the payload of the received A-PHY packet, and transmits the extracted Read request command to the I3C device section 12A. When normally receiving the Read request command from the A-PHY device section 12B, the I3C device section 12A returns ACK to the A-PHY device section 12B as a response to the reception of the Read request command.

When receiving the ACK from the I3C device section 12A, the A-PHY device section 12B transmits the I3C CCC Direct Read command to the I3C device section 12A. When receiving the I3C CCC Direct Read command from the A-PHY device section 12B, the I3C device section 12A acquires I3C Read data and transmits the acquired I3C Read data and an IBI (In-Band Interrupt) command to the A-PHY device section 12B.

When receiving the I3C Read data along with the IBI command, the A-PHY device section 12B encapsulates the I3C Read data into a payload and transmits the encapsulated I3C Read data to the control apparatus 20 (the communication device 21) via the bus 30 as an A-PHY packet. That is, the A-PHY device section 12B transmits the A-PHY packet including the I3C Read data to the control apparatus 20 (the communication device 21) via the bus 30 by using the payload in the A-PHY, as a response to the A-PHY packet received from the control apparatus 20 (the communication device 21).

When receiving the A-PHY packet from the sensor apparatus 10 (the communication device 12) via the bus 30 as a response to the transmission of the Read request command or the like, the A-PHY device section 21A extracts the I3C Read data from the payload of the A-PHY packet and transmits the extracted I3C Read data to the I3C device section 21B along with the IBI command. When receiving the I3C Read data along with the IBI command, the I3C device section 21B stores the received I3C Read data in a predetermined address. In this way, the reading process in the communication system 1 is executed. It is to be noted that the above-described reading process has been described by using Directed CCC as an example, but it is also possible to execute the above-described reading process with Directed CCC replaced with Broadcast CCC.

Next, a description is given on another example of the reading process executed in the communication system 1 with reference to FIG. 7. It is to be noted that, in this reading process, the same process as the above-described reading process is executed until the I3C device section 21B transmits the I3C CCC Direct Read command to the A-PHY device section 21A. Accordingly, the following describes subsequent processes.

The I3C device section 21B executes a polling process without waiting for the reception of an IBI command after transmitting an I3C CCC Direct Read command to the A-PHY device section 21A. Specifically, the I3C device section 21B regularly transmits a Read request command to the A-PHY device section 21A by using I3C Directed CCC.

When receiving the I3C CCC Direct Read command, the A-PHY device section 21A encapsulates the Read request command and the I3C CCC Direct Read command into a payload and transmits the encapsulated commands to the sensor apparatus 10 (the communication device 12) as an A-PHY packet via the bus 30. That is, the A-PHY device section 21A transmits the Read request command and the I3C CCC Direct Read command to the sensor apparatus 10 (the communication device 12) via the bus 30 by using the payload in the A-PHY.

The A-PHY device section 12B receives the A-PHY packet from the control apparatus 20 (the communication device 21) via the bus 30. That is, the A-PHY device section 12B receives the A-PHY packet from the control apparatus 20 (the communication device 21) via the bus 30 by using the payload in the A-PHY. The A-PHY device section 12B extracts the Read request command from the payload of the received A-PHY packet, and transmits the extracted Read request command to the I3C device section 12A. When normally receiving the Read request command from the A-PHY device section 12B, the I3C device section 12A returns ACK to the A-PHY device section 12B as a response to the reception of the Read request command.

When receiving the ACK from the I3C device section 12A, the A-PHY device section 12B transmits the I3C CCC Direct Read command to the I3C device section 12A. When receiving the I3C CCC Direct Read command from the A-PHY device section 12B, the I3C device section 12A acquires I3C Read data and transmits the acquired I3C Read data to the A-PHY device section 12B. At this time, the I3C device section 12A uses no IBI command.

When receiving the I3C Read data, the A-PHY device section 12B encapsulates the I3C Read data into a payload and transmits the encapsulated I3C Read data to the control apparatus 20 (the communication device 21) via the bus 30 as an A-PHY packet. That is, the A-PHY device section 12B transmits the A-PHY packet including the I3C Read data to the control apparatus 20 (the communication device 21) via the bus 30 by using the payload in the A-PHY, as a response to the A-PHY packet received from the control apparatus 20 (the communication device 21).

When receiving the A-PHY packet from the sensor apparatus 10 (the communication device 12) via the bus 30 as a response to the transmission of the Read request command or the like, the A-PHY device section 21A extracts the I3C Read data from the payload of the A-PHY packet. After transmitting ACK to the I3C device section 21B as a response to the Read request command, the A-PHY device section 21A subsequently transmits the extracted I3C Read data to the I3C device section 21B. When receiving the ACK as a response to the Read request command, the I3C device section 21B stores the I3C Read data received thereafter in a predetermined address. In this way, the reading process in the communication system 1 is executed.

It is to be noted that, as illustrated in FIG. 8, the A-PHY device section 21A may transmit NACK to the I3C device section 21B in a case where no response is transmitted from the sensor apparatus 10 (the communication device 12) while the polling process is being executed for a predetermined period of time. When receiving the NACK from the I3C device section 21B, the I3C device section 21B terminates the polling process. In such a case, the polling process is surely terminated even when a response fails to be received from the sensor apparatus 10 (the communication device 12).

In addition, as illustrated in FIG. 9, the A-PHY device section 21A may transmit a communication failure flag (NG) to the I3C device section 21B along with an IBI command in a case where no response is transmitted from the sensor apparatus 10 (the communication device 12) for a predetermined period of time. When receiving the communication failure flag (NG) from the I3C device section 21B along with the IBI command, the I3C device section 21B terminates the polling process. In such a case, the polling process is surely terminated even when a response fails to be received from the sensor apparatus 10 (the communication device 12).

Effects

Next, effects of the communication system 1 according to the present embodiment are described.

In the present embodiment, the command and data of the I3C are transmitted to the other communication device via the bus 30 by using the payload in the protocol (A-PHY) different from the I3C. In this way, the use of the payload enables the transmission of the command and data of the I3C in the protocol (A-PHY) different from the I3C. Therefore, it is possible to transmit the data of the I3C in the protocol different from the I3C.

In addition, in the present embodiment, the command and data of the I3C are encapsulated into the payload and transmitted to another communication device. In this way, the use of the encapsulation into the payload enables the transmission of the command and data of the I3C in the protocol (A-PHY) different from the I3C. Therefore, it is possible to transmit the data of the I3C in the protocol (A-PHY) different from the I3C.

In addition, in the present embodiment, the command of the I3C includes an I3C CCC command Thus, the use of the CCC command enables the management of an address required to generate ACK and the control of the Read data. As a result, it is possible to eliminate the generation of latency in I3C communication via the A-PHY.

In addition, in the present embodiment, when normally receiving a command of the I3C, the A-PHY device section 21A returns ACK to the I3C device section 21B as a response to the reception of the command of the I3C. This allows the communication between the I3C device section 21B and the A-PHY device section 21A to be smoothly executed.

In addition, in the present embodiment, the command of the I3C includes the I3C CCC Write command and the I3C Write data. This makes it possible to use the CCC command to perform the writing process while performing the management of an address required to generate ACK.

In addition, in the present embodiment, the command of the I3C includes an I3C CCC Read command. This makes it possible to use the CCC command to perform the reading process while performing the management of an address required to generate ACK.

In addition, in the present embodiment, the A-PHY device section 21A encapsulates the CCC Read command into a payload and transmits the encapsulated CCC Read command to the sensor apparatus 10 (the communication device 12). As a response thereto, the A-PHY device section 21A receives the Read data encapsulated into the payload from the sensor apparatus 10 (the communication device 12), and transmits the received Read data to the I3C device section 21B as a response to the CCC Read command. This makes it possible to use the CCC command to perform the reading process while performing the management of an address required to generate ACK.

In addition, in the present embodiment, in a case where the I3C device section 21B receives ACK from the A-PHY device section 21A as a response to the reception of the CCC command, the I3C device section 21B transmits the I3C CCC Write command and the I3C Write data to the A-PHY device section 21A as a response thereto. This makes it possible to use the CCC command to perform the writing process while performing the management of an address required to generate ACK.

In addition, in the present embodiment, in a case where the I3C device section 21B receives ACK from the A-PHY device section 21A as a response to the reception of the CCC command, the I3C device section 21B transmits the I3C CCC Read command to the A-PHY device section 21A as a response thereto. This makes it possible to use the CCC command to perform the reading process while performing the management of an address required to generate ACK.

In addition, in the present embodiment, in a case where the Read data is not transmitted from the sensor apparatus 10 (the communication device 12) to the A-PHY device section 21A under a predetermined condition, the A-PHY device section 21A transmits the communication failure flag to the I3C device section 21B by using the NACK or IBI. This enables the polling process to be surely terminated even when no response is transmitted from the sensor apparatus 10 (the communication device 12).

In addition, in the present embodiment, the A-PHY device section 21A transmits the command of the I3C described above via the MIPI A-PHY circuit. This enables the transmission of the command and data of the I3C in the protocol (A-PHY) different from the I3C.

In addition, in the present embodiment, the A-PHY device section 12B receives the command and data of the I3C from the control apparatus 20 (the communication device 21) via the bus 30 by using the payload in the protocol (A-PHY) different from the I3C. As a response to the received command of the I3C, the A-PHY device section 12B transmits the data of the I3C to the control apparatus 20 (the communication device 21) via the bus 30 by using the payload in the protocol (A-PHY) different from the I3C. In this way, the use of the payload enables the transmission and reception of the command and data of the I3C in the protocol different from the I3C.

In addition, in the present embodiment, the A-PHY device section 12B receives the command of the I3C encapsulated into the payload, encapsulates the data of the I3C encapsulated into the payload, and transmits the encapsulated data to the sensor apparatus 10 (the communication device 12). In this way, the use of the encapsulation into the payload enables the transmission and reception of the command and data of the I3C in the protocol (A-PHY) different from the I3C.

In addition, in the present embodiment, when the A-PHY device section 12B receives the I3C CCC Read command, the I3C device section 12A acquires the Read data. The Read data serving as the data of the I3C and the IBI command of the I3C are outputted from the I3C device section 12A to the A-PHY device section 12B. Further, the A-PHY device section 12B encapsulates the Read data and the IBI command of the I3C into the payload, and transmits the encapsulated Read data and IBI command to the control apparatus 20 (the communication device 21). This enables the smooth reading process utilizing the CCC command and the IBI command.

In addition, in the present embodiment, when the A-PHY device section 12B receives the I3C CCC Read command, the I3C device section 12A acquires the Read data. The Read data serving as the data of the I3C is outputted from the I3C device section 12A to the A-PHY device section 12B. Further, the A-PHY device section 12B encapsulates the Read data into the payload, and transmits the encapsulated Read data to the control apparatus 20 (the communication device 21). This enables the smooth reading process utilizing the CCC command and the IBI command.

MODIFICATION EXAMPLES

Modification Example A

Figure 10:
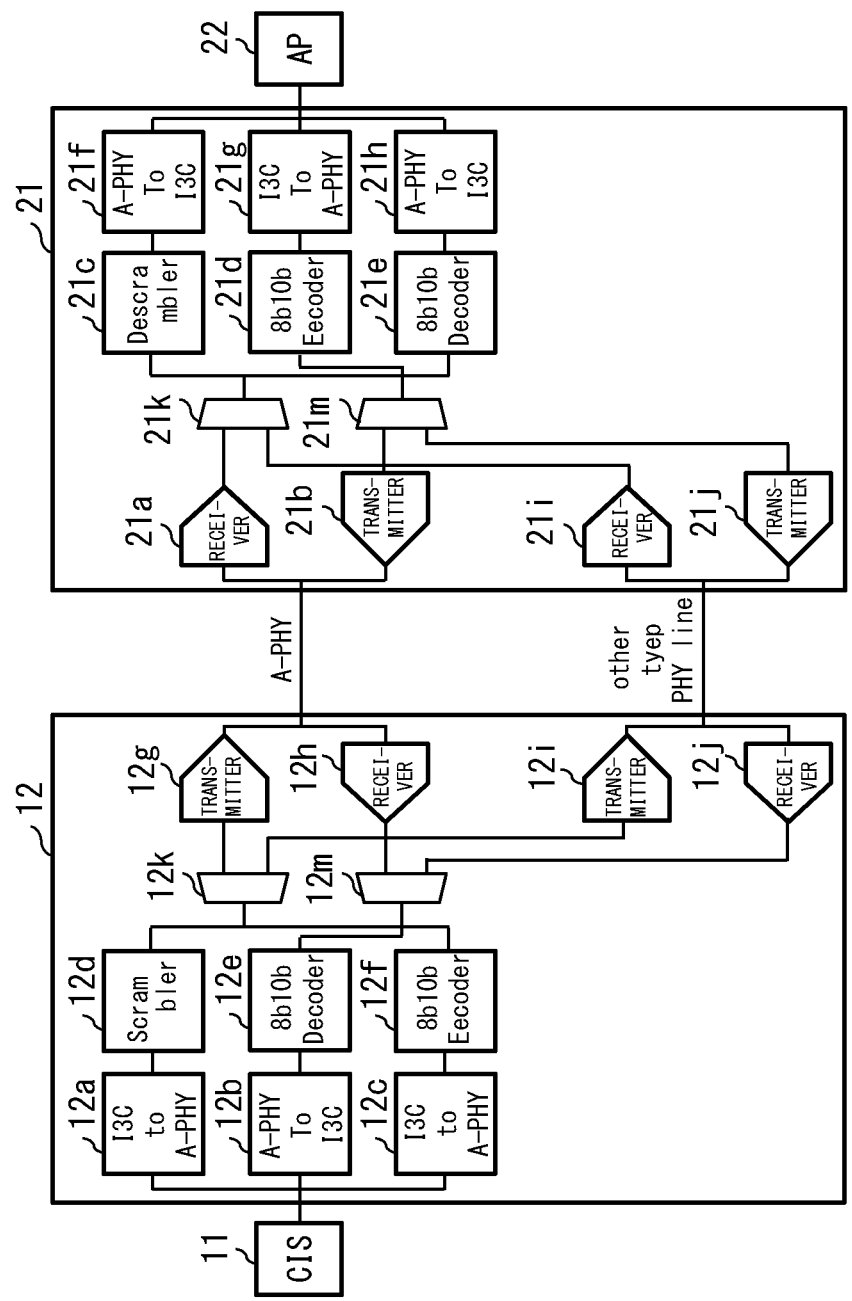
FIG. 10 is a diagram illustrating a modification example of the functional blocks of the communication devices in the sensor apparatus and the control apparatus.

In the above-described embodiment, the communication devices 12 and 21 may each include a plurality of types of PHY circuits. In this case, each of the communication devices 12 and 21 transmits a command and data of the I3C via a PHY circuit selected from the plurality of types of PHY circuits. For example, as illustrated in FIG. 10, the communication device 12 further includes a transmitter 12$i$, a receiver 12$j$, and switches 12$k$ and 12$m$, and the communication device 21 further includes a receiver 21$i$, a transmitter 21$j$, and switches 21$k$ and 21$m$.

The converter 12$a$ converts image data and command of the I3C into transmission data of the A-PHY or another type of PHY, and outputs the transmission data to the scrambler 12$d$. The converter 12$b$ converts the transmission data of the A-PHY or another type of PHY inputted from the decoder 12$e$ into a command and data of the I3C and outputs the command and data of the I3C to the image sensor 11. The converter 12$c$ converts image data and command of the I3C into transmission data of the A-PHY or another type of PHY, and outputs the transmission data to the encoder 12$f$.

The converter 21$f$ converts the transmission data of the A-PHY or the other type of PHY inputted from the descrambler 21$c$ into image data and command of the I3C and transmits the image data and command of the I3C to the application processor 22. The converter 21$g$ converts the data and command of the I3C transmitted from the application processor 22 into transmission data of the A-PHY or another type of PHY and outputs the transmission data of the A-PHY to the encoder 21$d$. The converter 21$h$ converts the transmission data of the transmission data of the A-PHY or the other type of PHY inputted from the decoder 21$e$ into image data and command of the I3C and transmits the image data and command of the I3C to the application processor 22.

The switch 12$k$ outputs the transmission data of the A-PHY inputted from the scrambler 12$d$ or the encoder 21$d$ to any of the transmitter 12$g$ and the transmitter 12$i$. The switch 12$m$ outputs, to the decoder 12$e$, any of the transmission data of the A-PHY inputted from the receiver 12$h$ and the transmission data of the other type of PHY inputted from the receiver 12$j$.

The switch 21$k$ outputs, to the descrambler 21$c$ and the decoder 21$e$, any of the transmission data of the A-PHY inputted from the receiver 21$a$ and the transmission data of the other type of PHY inputted from the receiver 21$i$. The switch 21$m$ outputs the transmission data inputted from the encoder 21$d$ to any of the transmitter 21$b$ and the transmitter 21$j$.

In the present modification example, the output terminal of the transmitter 12$g$ and the output terminal of the transmitter 12$i$ may be provided separately from each other, and the input terminal of the receiver 21$a$ and the input terminal of the receiver 21$i$ may be provided separately from each other. In addition, in the present modification example, the output terminal of the transmitter 12$g$ and the output terminal of the transmitter 12$i$ may be configured as a terminal common to each other, and the input terminal of the receiver 21$a$ and the input terminal of the receiver 21$i$ may be configured as a terminal common to each other.

Figure 11:
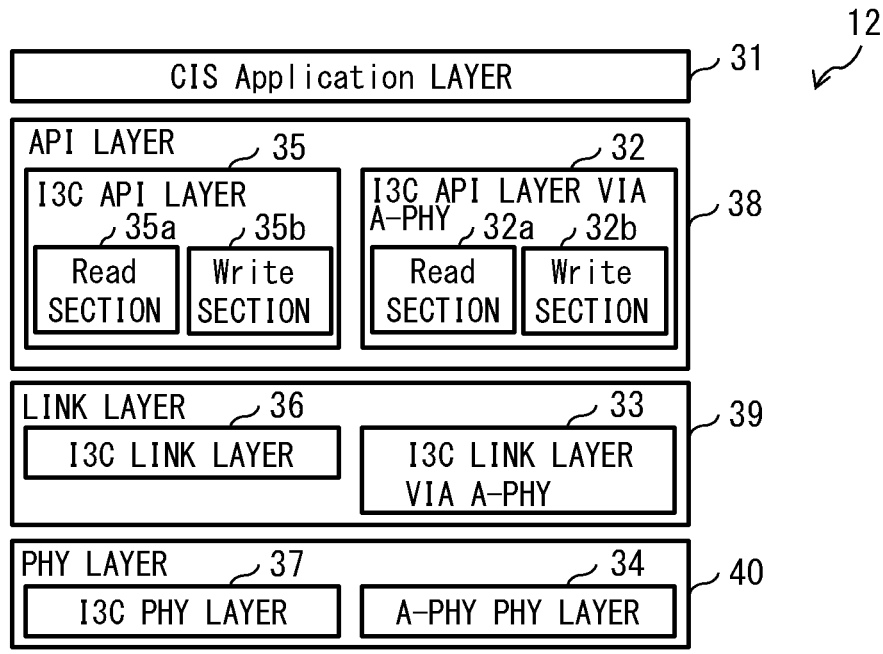
FIG. 11 is a diagram illustrating a modification example of a hierarchical structure of the communication device in the sensor apparatus.
Figure 12:
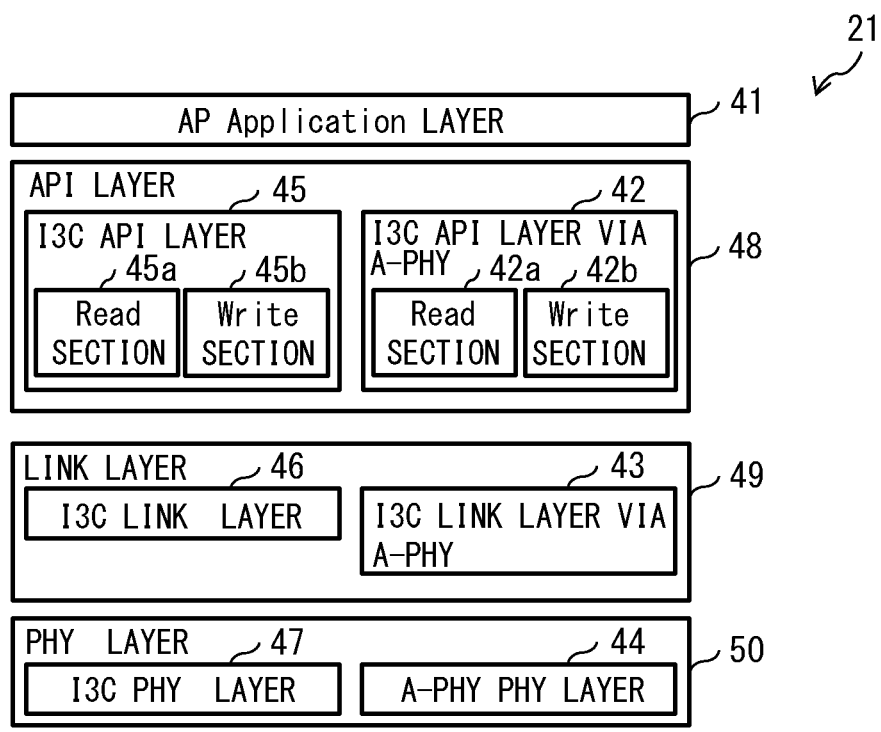
FIG. 12 is a diagram illustrating a modification example of a hierarchical structure of the communication device in the control apparatus.

FIG. 11 illustrates an example of the hierarchical structure of the communication device 12 according to the present modification example. FIG. 12 illustrates an example of the hierarchical structure of the communication device 21 according to the present modification example.

The communication device 12 includes, for example, the application layer (AP layer) 31 as an uppermost layer, and an application program interface layer (API layer) 38 as a lower layer under the AP layer 31. The API layer 38 includes an API layer 35 of the I3C and the API layer 32 of the I3C for use via the A-PHY. The API layer 35 includes a Read section 35a and a Write section 35b. The communication device 12 further includes, for example, a LINK layer 39 as a lower layer under the API layer 38 and a PHY layer 40 as a lowermost layer. The LINK layer 39 includes a LINK layer 36 of the I3C and the LINK layer 33 for use via the A-PHY. The PHY layer 40 includes a PHY layer 37 of the I3C and the PHY layer 34 for use via the A-PHY.

The communication device 21 includes, for example, the application layer (AP layer) 41 as an uppermost layer, and an application program interface layer (API layer) 48 as a lower layer under the AP layer 41. The API layer 48 includes an API layer 45 of the I3C and the API layer 42 of the I3C for use via the A-PHY. The API layer 45 includes a Read section 45a and a Write section 45b. The communication device 21 further includes, for example, a LINK layer 49 as a lower layer under the API layer 48 and a PHY layer 50 as a lowermost layer. The LINK layer 49 includes a LINK layer 46 of the I3C and the LINK layer 43 for use via the A-PHY. The PHY layer 50 includes a PHY layer 47 of the I3C and the PHY layer 44 for use via the A-PHY.

The AP layer 31 generates and provides data, a command, and the like to the API layer 38. The API layer 38 converts the data, the command, and the like provided from the AP layer 31 into a data format processable by the LINK layer 39 or the PHY layer 40. The API layer 38 selects any of the API layers 32 and 35 on the basis of predetermined control, and provides the selected API layer with data, command, and the like provided from the AP layer 31. The API layer 38 converts the data, the command, and the like provided from the LINK layer 39 into a data format processable by the AP layer 31. The API layer 38 selects any of the API layers 32 and 35 on the basis of predetermined control, and provides the selected API layer with data, command, and the like provided from the LINK layer 39.

The API layer 32 converts the data, the command, and the like provided from the AP layer 31 into a data format (a data format based on the A-PHY standard) processable by the LINK layer 33 or the PHY layer 34. The API layer 32 converts the data, the command, and the like provided from the LINK layer 33 into a data format processable by the AP layer 31. For example, the Read section 32a converts the Read data, the command, and the like provided from the AP layer 31 into a data format (a data format based on the A-PHY standard) processable by the LINK layer 33 or the PHY layer 34. For example, the Read section 32a converts the data, the Read command, and the like provided from the LINK layer 33 into a data format process able by the AP layer 31. For example, the Write section 32b converts the data, the Write command, and the like provided from the AP layer 31 into a data format (a data format based on the A-PHY standard) processable by the LINK layer 33 or the PHY layer 34. For example, the Write section 32b converts the Write data, the command, and the like provided from the LINK layer 33 into a data format processable by the AP layer 31.

The API layer 35 converts the data, the command, and the like provided from the AP layer 31 into a data format (a data format based on another type of PHY standard different from the A-PHY) processable by the LINK layer 36 or the PHY layer 37. The API layer 35 converts the data, the command, and the like provided from the LINK layer 36 into a data format processable by the AP layer 31. For example, the Read section 35a converts the Read data, the command, and the like provided from the AP layer 31 into a data format (a data format based on another type of PHY standard different from the A-PHY) processable by the LINK layer 36 or the PHY layer 37. For example, the Read section 35a converts the data, the Read command, and the like provided from the LINK layer 36 into a data format processable by the AP layer 31. For example, the Write section 35b converts the data, the Write command, and the like provided from the AP layer 31 into a data format (a data format based on another type of PHY standard different from the A-PHY) processable by the LINK layer 36 or the PHY layer 37. For example, the Write section 35b converts the Write data, the command, and the like provided from the LINK layer 36 into a data format processable by the AP layer 31.

The LINK layer 39 secures a physical communication path with a communication partner and performs contention control and the like. The LINK layer 33 secures a physical communication path with a communication partner via the A-PHY and performs contention control and the like. The LINK layer 36 secures a physical communication path with a communication partner via another type of PHY different from the A-PHY and performs contention control and the like. The PHY layer 40 is physically coupled to the PHY layer 50 mutually. The PHY layer 34 is physically coupled to the PHY layer 44 mutually via the A-PHY. The PHY layer 37 is physically coupled to the PHY layer 47 mutually via another type of PHY different from the A-PHY.

The AP layer 41 generates and provides data, a command, and the like to the API layer 48. The API layer 48 converts the data, the command, and the like provided from the AP layer 41 into a data format processable by the LINK layer 49 or the PHY layer 50. The API layer 48 selects any of the API layers 42 and 45 on the basis of predetermined control, and provides the selected API layer with data, command, and the like provided from the AP layer 41. The API layer 48 converts the data, the command, and the like provided from the LINK layer 49 into a data format processable by the AP layer 41. The API layer 48 selects any of the API layers 42 and 45 on the basis of predetermined control, and provides the selected API layer with data, command, and the like provided from the LINK layer 49.

The API layer 42 converts the data, the command, and the like provided from the AP layer 41 into a data format (a data format based on the A-PHY standard) processable by the LINK layer 43 or the PHY layer 44. The API layer 42 converts the data, the command, and the like provided from the LINK layer 43 into a data format processable by the AP layer 41. For example, the Read section 42a converts the Read data, the command, and the like provided from the AP layer 41 into a data format (a data format based on the A-PHY standard) processable by the LINK layer 43 or the PHY layer 44. For example, the Read section 42a converts the data, the Read command, and the like provided from the LINK layer 43 into a data format process able by the AP layer 41. For example, the Write section 42b converts the data, the Write command, and the like provided from the AP layer 41 into a data format (a data format based on the A-PHY standard) processable by the LINK layer 43 or the PHY layer 44. For example, the Write section 42b converts the Write data, the command, and the like provided from the LINK layer 43 into a data format processable by the AP layer 41.

The API layer 45 converts the data, the command, and the like provided from the AP layer 41 into a data format (a data format based on another type of PHY standard different from the A-PHY) processable by the LINK layer 46 or the PHY layer 47. The API layer 45 converts the data, the command, and the like provided from the LINK layer 46 into a data format processable by the AP layer 41. For example, the Read section 45a converts the Read data, the command, and the like provided from the AP layer 41 into a data format (a data format based on another type of PHY standard different from the A-PHY) processable by the LINK layer 46 or the PHY layer 47. For example, the Read section 45a converts the data, the Read command, and the like provided from the LINK layer 46 into a data format processable by the AP layer 41. For example, the Write section 45b converts the data, the Write command, and the like provided from the AP layer 41 into a data format (a data format based on another type of PHY standard different from the A-PHY) processable by the LINK layer 46 or the PHY layer 47. For example, the Write section 45b converts the Write data, the command, and the like provided from the LINK layer 46 into a data format processable by the AP layer 41.

The LINK layer 49 secures a physical communication path with a communication partner and performs contention control and the like. The LINK layer 43 secures a physical communication path with a communication partner via the A-PHY and performs contention control and the like. The LINK layer 46 secures a physical communication path with a communication partner via another type of PHY different from the A-PHY and performs contention control and the like. The PHY layer 50 is physically coupled to the PHY layer 40 mutually. The PHY layer 44 is physically coupled to the PHY layer 34 mutually via the A-PHY. The PHY layer 47 is physically coupled to the PHY layer 37 mutually via another type of PHY different from the A-PHY.

The present modification example has a configuration similar to that of the above-described embodiment except that the type of PHY for transmission through the bus 30 is selectable. Therefore, like the above-described embodiment, it is possible to transmit data of the I3C in a protocol (the A-PHY or another type of PHY different from the A-PHY) different from the I3C.

In the present modification example, in the API layer 38, any of the API layers 32 and 35 is selected on the basis of predetermined control, and the selected API layer is provided with data, command, and the like provided from the AP layer 31. In addition, in the present modification example, in the API layer 48, any of the API layers 42 and 45 is selected on the basis of predetermined control, and the selected API layer is provided with data, command, and the like provided from the AP layer 41. This enables each of the API layers 38 and 48 to select appropriate PHY, for example, corresponding to the capacity, speed, or the like of data to be transmitted.

Modification Example B

Figure 13:
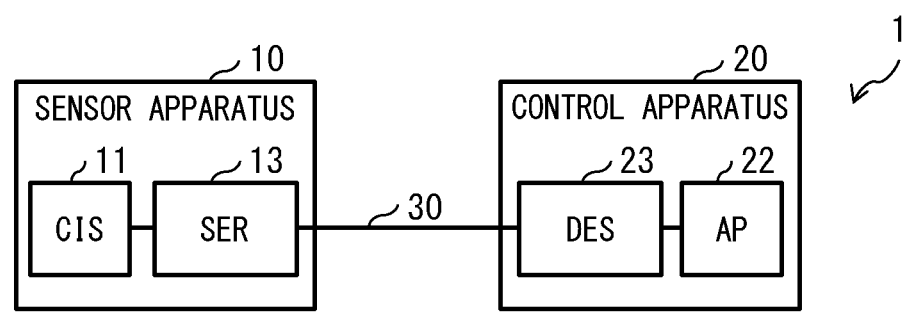
FIG. 13 is a diagram illustrating a modification example of a schematic configuration of the communication system of FIG. 1.

In the above-described embodiment and modification example thereof, for example, as illustrated in FIG. 13, SER 13 may be provided instead of the communication device 12, and DES 23 may be provided instead of the communication device 21. The SER 13 and the DES 23 are FPDLink circuits. Specifically, the SER 13 is a serializer, the DES 23 is a deserializer, and the FPDLink standard is used for signal transmission between the SER 13 and the DES 23.

The present modification example has a configuration similar to that of the above-described embodiment except that the protocol for transmission through the bus 30 is the FPDLink. Therefore, like the above-described embodiment, it is possible to transmit data of the I3C in a protocol (the A-PHY or another type of PHY different from the A-PHY) different from the I3C.

Adaptation Example

Figure 14:
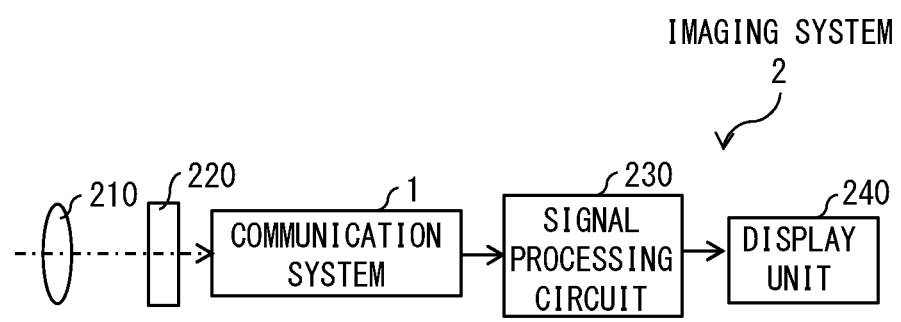
FIG. 14 is a diagram illustrating an example of a schematic configuration of an imaging system.

FIG. 14 illustrates an example of a schematic configuration of an imaging system 2 that includes the communication system 1 according to the above-described embodiment and modification examples thereof. The imaging system 2 includes, for example, an optical system 210, a shutter device 220, the communication system 1, a signal processing circuit 230, and a display unit 240.

The optical system 210 forms image light (incident light) from a subject on an imaging surface of the communication system 1 (the image sensor 11). The shutter device 220 is placed between the optical system 210 and the imaging system 2. The shutter device 220 controls a light irradiation period and a light shielding period with respect to the communication system 1 (the image sensor 11). The communication system 1 receives image light (incident light) incident from the outside in the image sensor 11, and outputs a pixel signal corresponding to the received image light (the incident light) to the signal processing circuit 230. The signal processing circuit 230 processes the image signal inputted from the communication system 1 to generate video data. The signal processing circuit 230 further generates a video signal corresponding to the generated video data and outputs the video signal to the display unit 240. The display unit 240 displays a video picture based on the video signal inputted from the signal processing circuit 230.

In the present adaptation example, the communication system 1 according to the above-described embodiment and modification examples thereof is applied to the imaging system 2. This makes it possible to, for example, to perform appropriate communication corresponding to the capacity, speed, or the like of data to be transmitted, allowing the imaging system 2 to be provided that has high imaging quality.

Application Example

The technology (the present technology) according to the present disclosure is applicable to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

Figure 15:
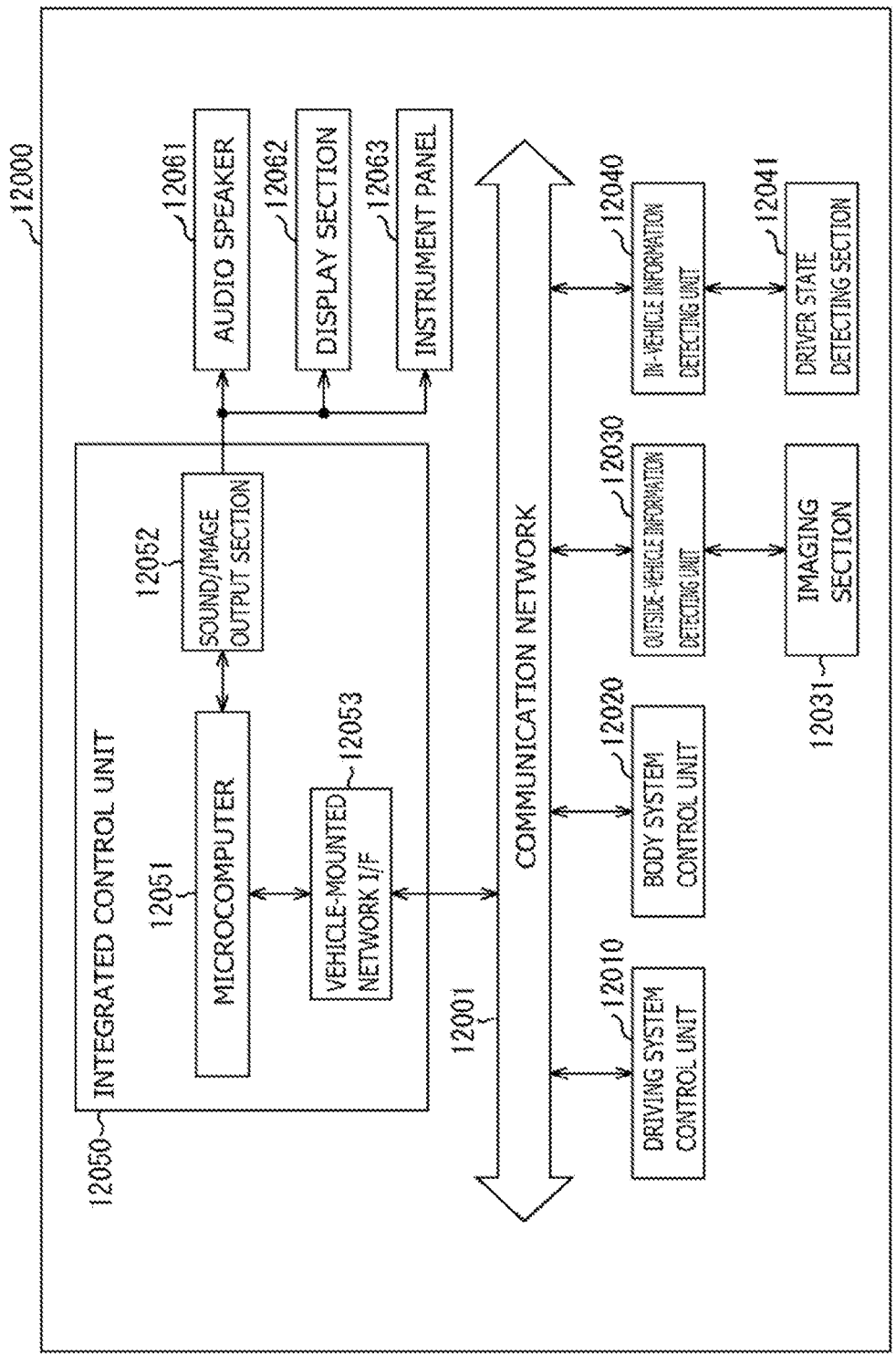
FIG. 15 is a block diagram depicting an example of schematic configuration of a vehicle control system.

FIG. 15 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 15, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (UF) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 15, an audio speaker 12061, a display section 12062, and an instrument panel 12063 are illustrated as the output device. The display section 12062 may, for example, include at least one of an on-board display and a head-up display.

Figure 16:
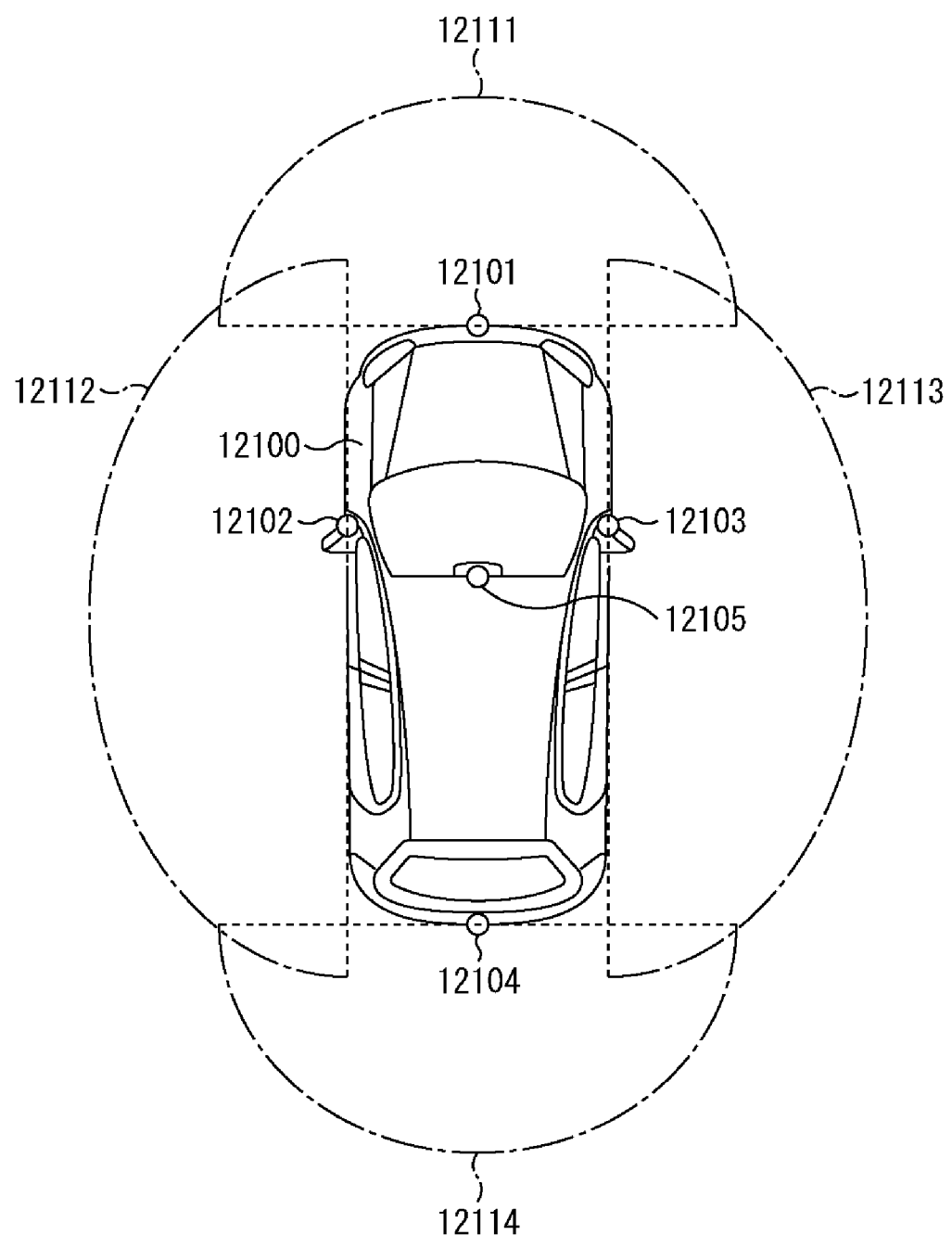
FIG. 16 is a diagram of assistance in explaining an example of installation positions of an outside-vehicle information detecting section and an imaging section.

FIG. 16 is a diagram depicting an example of the installation position of the imaging section 12031.

The vehicle 12100 includes imaging sections 12101, 12102, 12103, 12104, and 12105 as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The images of the area ahead acquired by the imaging sections 12101 and 12105 are used chiefly to detect a preceding vehicle, a pedestrian, an obstacle, a traffic light, a traffic sign, a lane, or the like.

Incidentally, FIG. 16 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the mobile body control system to which the technology according to the present disclosure may be applied. The technology according to the present disclosure may be applied to the imaging section 12031 among the components described above. Specifically, the imaging system 2 is applicable to the imaging section 12031. The application of the technology according to the present disclosure to the imaging section 12031 makes it possible to obtain a captured image with high image quality, and it is thus possible to achieve highly accurate control using the captured image in the mobile body control system.

Although the above has described the present disclosure with reference to the embodiment, the modification examples, and the application example, the present disclosure is not limited to the above-described embodiment and the like, but may be modified in a variety of ways. It is to be noted that the effects described herein are merely illustrative. The effects of the present disclosure are not limited to the effects described herein. The present disclosure may have effects other than the effects described herein.

In addition, for example, it is possible to configure the present disclosure as follows.

(1)

A communication device including:

an I3C (Improved Integrated Circuit) device section that generates a command and data of I3C; and a communication device section that transmits the command and data of the I3C to another communication device via a bus by using a payload in a protocol different from the I3C.

(2)

The communication device according to (1), in which the communication device section encapsulates the command and data of the I3C into the payload and transmits the encapsulated command and data to the other communication device.

(3)

The communication device according to (1) or (2), in which the command of the I3C includes an I3C CCC (Common Command Code) command.

(4)

The communication device according to (3), in which, when normally receiving the command of the I3C, the communication device section returns ACK to the I3C device section as a response to reception of the command of the I3C.

(5)

The communication device according to any one of (1) to (4), in which the command of the I3C includes an I3C CCC Write command, and the data of the I3C includes I3C Write data.

(6)

The communication device according to any one of (1) to (4), in which the command of the I3C includes an I3C CCC Read command.

(7)

The communication device according to (6), in which the communication device section encapsulates the CCC Read command into the payload, transmits the encapsulated CCC Read command to the other communication device, receives Read data encapsulated into the payload from the other communication device as a response thereto, and transmits the received Read data to the I3C device section as a response to the CCC Read command.

(8)

The communication device according to (4), in which, in a case where the I3C device section receives the ACK from the communication device section as a response to reception of the CCC command, the I3C device section transmits an I3C CCC Write command and I3C Write data to the communication device section as a response thereto.

(9)

The communication device according to (4), in which, in a case where the I3C device section receives the ACK from the communication device section as a response to reception of the CCC command, the I3C device section transmits an I3C CCC Read command to the communication device section as a response thereto.

(10)

The communication device according to (9), in which, in a case where Read data is not transmitted from the other communication device to the communication device section under a predetermined condition, the communication device section transmits a communication failure flag to the I3C device section by using NACK or IBI (In-Band Interrupt).

(11)

The communication device according to any one of (1) to (10), in which the communication device section includes an MIPI A-PHY circuit, and transmits the command of the I3C via the MIPI A-PHY circuit.

(12)

The communication device according to any one of (1) to (10), in which the communication device section includes an FPDLink circuit, and transmits the command of the I3C via the FPDLink circuit.

(13)

The communication device according to any one of (1) to (12), in which the communication device section includes a plurality of types of PHY circuits, and transmits the command of the I3C via the PHY circuit selected from the plurality of types of PHY circuits.

(14)

A communication device including:

a reception device section that receives a command and data of an I3C (Improved Integrated Circuit) from another communication device via a bus by using a payload in a protocol different from the I3C; and a transmission device section that transmits the data of the I3C to the other communication device via the bus by using the payload in the protocol different from the I3C, as a response to the command and data of the I3C received by the reception device section.

(15)

The communication device according to (14), in which the reception device section receives the command and data of the I3C encapsulated into the payload, and the transmission device section encapsulates the data of the I3C into the payload, and transmits the encapsulated data of the I3C to the other communication device.

(16)

The communication device according to (14) or (15), in which the command of the I3C includes an I3C CCC Read command.

(17)

The communication device according to (16), further including an I3C device section that acquires Read data when the reception device section receives the I3C CCC Read command, and outputs the Read data and an IBI command of the I3C to the transmission device section, the Read data serving as the data of the I3C, in which the transmission device section encapsulates the Read data into the payload, and transmits the encapsulated Read data to the other communication device.

(18)

The communication device according to (16), further including an I3C device section that acquires Read data when the reception device section receives the I3C CCC Read command, and outputs the Read data to the transmission device section, the Read data serving as the data of the I3C, in which the transmission device section encapsulates the Read data into the payload, and transmits the encapsulated Read data to the other communication device.

(19)

A communication system including a first communication device and a second communication device that communicate via a bus, in which the first communication device includes an I3C (Improved Integrated Circuit) device section that generates a command and data of I3C, and a communication device section that transmits the command and data of the I3C to the second communication device via the bus by using a payload in a protocol different from the I3C.

(20)

The communication system according to (19), in which the second communication device includes a reception device section that receives the command and data of the I3C from the first communication device via the bus by using the payload in the protocol different from the I3C, and a transmission device section that transmits the command and data of the I3C to the first communication device via the bus by using the payload in the protocol different from the I3C, as a response to the command and data of the I3C received by the reception device section.

In the communication device according to the first aspect of the present disclosure, the command and data of the I3C are transmitted to the other communication device via the bus by using the payload in the protocol different from the I3C. This makes it possible to transmit the command and data of the I3C in the protocol different from the I3C.

In the communication device according to the second aspect of the present disclosure, the command and data of the I3C are received from the other communication device via the bus by using the payload in the protocol different from the I3C, and as a response to the received command and data of the I3C, the command and data of the I3C are transmitted to the other communication device via the bus by using the payload in the protocol different from the I3C. This makes it possible to transmit the command and data of the I3C in the protocol different from the I3C.

In the communication system according to the first aspect of the present disclosure, the command and data of the I3C are transmitted from the first communication device to the second communication device via the bus by using the payload in the protocol different from the I3C. This makes it possible to transmit the command and data of the I3C in the protocol different from the I3C.

REFERENCE SIGNS LIST

1 . . . Communication system, 10 . . . Sensor apparatus, 11 . . . Image sensor, 12 . . . Communication device, 12*a*, 12*b*, 12*c* . . . Converter, 12*d* . . . Scrambler, 12*e* . . . Decoder, 12f . . . Encoder, 12g, 12i . . . Transmitter, 12h, 12j . . . Receiver, 12k, 12m . . . Switch, 12A, 21B . . . I3C device section, 12B, 21A A-PHY device section, 13 . . . SER section, 20 . . . Control apparatus, 21 . . . Communication device, 21a, 21i . . . Receiver, 21b, 21j . . . Transmitter, 21c . . . Descrambler, 21d . . . Encoder, 21e . . . Decoder, 21f, 21g, 21h . . . Converter, 21k, 21m . . . Switch, 22 . . . Application processor, 23 . . . DES section, 31, 41 . . . Application layer, 32, 35, 38, 42, 45, 48 . . . API layer, 32a, 35a, 42a, 45a . . . Read section, 32b, 35b, 42b, 45b . . . Write section, 33, 36, 39, 43, 46, 49 . . . LINK layer, 34, 37, 40, 44, 47, 50 . . . PHY layer.

The invention claimed is:

1. A communication device comprising:
an I3C (Improved Integrated Circuit) device section that generates a command and data of I3C; and
a communication device section including a first MIPI A-PHY circuit that transmits the command and data of the I3C to a second communication device including a second MIPI A-PHY circuit via a bus by using a payload in a protocol different from the I3C,
wherein the first MIPI A-PHY circuit receives the command and data of the I3C directly from the I3C device section,
wherein the I3C device section includes an I3C application program interface (I3C API) layer and an I3C link layer, the I3C API is configured to
convert first command and data of the I3C from a camera application program interface (camera API) into a first data format that is processable by the first MIPI A-PHY circuit, and
convert second command and data from the first MIPI A-PHY circuit into a second data format that is processable by the camera API,
wherein the I3C link layer is configured to
secure a physical communication with a communication partner, and
perform contention control, and
wherein the first MIPI A-PHY circuit receives the command and data of the I3C directly from the I3C link layer.

2. The communication device according to claim 1, wherein the communication device section encapsulates the command and data of the I3C into the payload and transmits the encapsulated command and data to the second communication device.

3. The communication device according to claim 1, wherein the command of the I3C includes an I3C CCC (Common Command Code) command.

4. The communication device according to claim 3, wherein, when normally receiving the command of the I3C, the communication device section returns ACK to the I3C device section as a response to reception of the command of the I3C.

5. The communication device according to claim 1, wherein
the command of the I3C includes an I3C CCC Write command, and
the data of the I3C includes I3C Write data.

6. The communication device according to claim 1, wherein the command of the I3C includes an I3C CCC Read command.

7. The communication device according to claim 6, wherein the communication device section encapsulates the I3C CCC Read command into the payload, transmits the encapsulated I3C CCC Read command to the second communication device, receives Read data encapsulated into the payload from the second communication device as a response thereto, and transmits the received Read data to the I3C device section as a response to the I3C CCC Read command.

8. The communication device according to claim 4, wherein, in a case where the I3C device section receives the ACK from the communication device section as a response to reception of the I3C CCC command, the I3C device section transmits an I3C CCC Write command and I3C Write data to the communication device section as a response thereto.

9. The communication device according to claim 4, wherein, in a case where the I3C device section receives the ACK from the communication device section as a response to reception of the I3C CCC command, the I3C device section transmits an I3C CCC Read command to the communication device section as a response thereto.

10. The communication device according to claim 9, wherein, in a case where Read data is not transmitted from the second communication device to the communication device section under a predetermined condition, the communication device section transmits a communication failure flag to the I3C device section by using NACK or IBI (In-Band Interrupt).

11. The communication device according to claim 1, wherein the communication device section includes an FPD-Link circuit, and transmits the command of the I3C via the FPDLink circuit.

12. The communication device according to claim 1, wherein the communication device section includes a plurality of types of PHY circuits, and transmits the command of the I3C via the PHY circuit selected from the plurality of types of PHY circuits.

13. The communication device according to claim 1, wherein the second communication device is a sensor device, and wherein the transmission of the command and data of the I3C using the payload in the protocol different from the I3C is directly connected to the sensor device via the bus.

14. The communication device according to claim 1, wherein the protocol different from the I3C has a maximum transmission distance of 15 meters (m).

15. The communication device according to claim 1, wherein the bus is a common half-duplex link that provides communication in both directions and only one direction at a time.

16. A communication device comprising:
an I3C (Improved Integrated Circuit) device section;
a reception device section of a first MIPI A-PHY circuit that receives a command and data of an I3C from a second MIPI A-PHY circuit of a first communication device via a bus by using a payload in a protocol different from the I3C; and
a transmission device section of the first MIPI A-PHY circuit that transmits the data of the I3C to the second MIPI A-PHY circuit of the first communication device via the bus by using the payload in the protocol different from the I3C, as a response to the command and data of the I3C received by the reception device section,
wherein the first MIPI A-PHY circuit receives the command and data of the I3C directly from the second MIPI A-PHY circuit, and
wherein the I3C device section includes an I3C application program interface (I3C API) layer and an I3C link layer, the I3C API configured to convert first command and data of the I3C from a camera application program interface (camera API) into a first data format that is processable by the second MIPI A-PHY circuit, and convert second command and data from the second MIPI A-PHY circuit into a second data format that is processable by the camera API, wherein the I3C link layer is configured to
   secure a physical communication with a communication partner, and
   perform contention control, and wherein the second MIPI A-PHY circuit receives the command and data of the I3C directly from the I3C link layer.

17. The communication device according to claim 16, wherein the reception device section receives the command and data of the I3C encapsulated into the payload, and the transmission device section encapsulates the data of the I3C into the payload, and transmits the encapsulated data of the I3C to the first communication device.

18. The communication device according to claim 16, wherein the command of the I3C includes an I3C CCC Read command.

19. The communication device according to claim 18, wherein the I3C device section acquires Read data when the reception device section receives the I3C CCC Read command, and outputs the Read data and an IBI command of the I3C to the transmission device section, the Read data serving as the data of the I3C, wherein the transmission device section encapsulates the Read data into the payload, and transmits the encapsulated Read data to the first communication device.

20. The communication device according to claim 18, wherein the I3C device section acquires Read data when the reception device section receives the I3C CCC Read command, and outputs the Read data to the transmission device section, the Read data serving as the data of the I3C, wherein the transmission device section encapsulates the Read data into the payload, and transmits the encapsulated Read data to the first communication device.

21. A communication system comprising
a first communication device and a second communication device that communicate via a bus, wherein the first communication device includes
   an I3C (Improved Integrated Circuit) device section that generates a command and data of I3C,
   a communication device section including a first MIPI A-PHY circuit that transmits the command and data of the I3C to the second communication device via the bus by using a payload in a protocol different from the I3C, wherein the second communication device includes a second MIPI A-PHY circuit, and wherein the first MIPI A-PHY circuit receives the command and data of the I3C directly from the I3C device section, and wherein the I3C device section includes an I3C application program interface (I3C API) layer and an I3C link layer, the I3C API configured to convert first command and data of the I3C from a camera application program interface (camera API) into a first data format that is processable by the second MIPI A-PHY circuit, and convert second command and data from the second MIPI A-PHY circuit into a second data format that is processable by the camera API, wherein the I3C link layer is configured to
   secure a physical communication with a communication partner, and
   perform contention control, and wherein the first MIPI A-PHY circuit receives the command and data of the I3C directly from the I3C link layer.

22. The communication system according to claim 21, wherein the second MIPI A-PHY circuit includes a reception device section that receives the command and data of the I3C from the first communication device via the bus by using the payload in the protocol different from the I3C, and a transmission device section that transmits the command and data of the I3C to the first communication device via the bus by using the payload in the protocol different from the I3C, as a response to the command and data received by the reception device section.

* * * * *